Aug. 28, 1951            C. P. SEITZ            2,565,526
PRESSURE-RESPONSIVE COMPRESSED-GAS SUPPLY GAUGE
Filed March 25, 1948
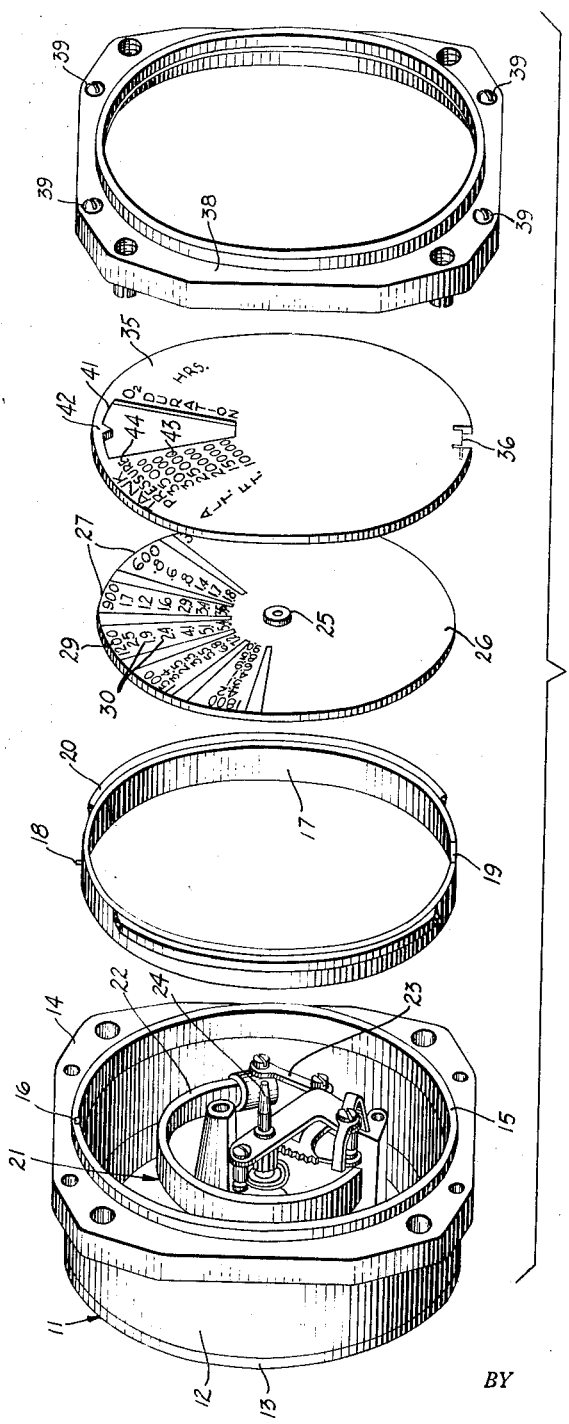
INVENTOR.
CLIFFORD P. SEITZ
BY
*M. O. Hayes*
ATTORNEY Patented Aug. 28, 1951

2,565,526

UNITED STATES PATENT OFFICE 2,565,526

PRESSURE-RESPONSIVE COMPRESSED-GAS SUPPLY GAUGE

Clifford P. Seitz, Hicksville, N. Y., assignor, by direct and mesne assignments, to himself and Joseph N. Pecoraro, as trustees Application March 25, 1948, Serial No. 16,895

1 Claim. (Cl. 73—388)

(Granted under the act of March 3, 1883, as amended April 30, 1928; 370 O. G. 757)

The present invention concerns a pressure-responsive fluid-supply gauge and in particular concerns a gauge of this type for use in connection with aircraft oxygen equipment for indicating to an operator the length of time that the oxygen supply will last when used at selected altitude.

In high-altitude operation of aircraft it is conventional to provide for the pilot or other operator an oxygen-supply system to augment for respiration the available supply of oxygen from the atmosphere. The available supply of oxygen in the atmosphere decreases with increasing altitude so that it is necessary to use oxygen for respiration at a higher rate at high altitudes than at low altitudes.

Conventional oxygen-supply systems include a tank of compressed oxygen, metering means, conduits, an oxygen mask for the operator's face, and a pressure gauge. The pressure gauge indicates the pressure of the compressed oxygen in the supply tank so that the operator can compute the length of time that the oxygen supply will last during operation. Since there is less oxygen in the atmosphere in high altitudes than low altitudes, the rate of consumption of oxygen from the supply tank is higher at higher altitudes and therefore a tank of given volume at a given pressure will not last as long when used at high altitude as when used at low altitude.

Prior to the present invention it has been customary to provide the operator with a conversion chart that indicates for a particular pressure of the oxygen tank of known volume the length of time that the oxygen supply in the tank will last at selected altitude. In using this system it is necessary for the operator first to make an observation of the pressure indicated on the pressure gauge and then to refer to the conversion chart to determine the length of time the supply of oxygen will last at the altitude at which he intends to operate. This has the disadvantage of requiring several procedural steps by the operator before determining the final answer.

These disadvantages are overcome in the present invention by providing a direct-reading gauge that is responsive to the pressure of the fluid-supply tank and that indicates directly the number of hours the oxygen supply will last at a selected altitude of operation. It is necessary in using the device for the operator to make a single observation only of the gauge and to read directly therefrom the final desired answer.

An object of the invention is to provide a pressure-responsive fluid-supply gauge.

Another object is to provide a gauge of this type for use in the oxygen-supply system of aircraft for indicating to the operator the length of time that the oxygen supply will last during operation at a selected altitude.

Another object is to provide for connection to a fluid supply a pressure-responsive gauge having a casing, a spindle rotatable in response to changes in pressure of the fluid supply, a first member mounted on the spindle for rotation with the spindle, a second member mounted on the casing, one of the members containing a plurality of angularly-spaced groups of data arranged in correlation with a series of fluid-supply pressures, the other of the members having an index for registration with the data to identify the data corresponding to a particular fluid-supply pressure.

Another object is to provide for connection to a fluid supply a pressure-responsive gauge having a casing, a spindle rotatable in response to changes in pressure of the fluid supply, a dial plate mounted on the spindle for rotation with the spindle, the dial plate containing a plurality of angularly-spaced groups of data arranged in correlation with a series of fluid-supply pressures, and a masking plate secured to the casing to mask the data and having an inspection opening to expose one of the groups of data.

Further objects and advantages of this invention, as well as its construction, arrangement and operation will be apparent from the following description and claims, in which, The single figure is an exploded view of a preferred embodiment of the invention.

In the drawing there is shown a conventional casing 11 having a cylindrical body 12, a rear cover plate 13, a transverse face flange 14 and a longitudinal flange 15. A longitudinal slot 16 is provided on the inner surface of flange 15. Adapted to nest within flange 15 is a retaining ring 17 having a radial pin 18 adapted to seat in slot 16. The forward edge of retaining ring 17 opposite pin 18 is provided with a notch 19. In assembled relation retaining ring 17 extends forwardly beyond the forward end of flange 15. A sealing gasket 20 is disposed about the outside of retaining ring 17 for seating adjacent the forward end of flange 15.

Mounted within casing 11 is a conventional pressure-responsive assembly 21 including a Bourdon tube 22 adapted for connection with a fluid-supply source (not shown), a movement 23, and a spindle 24 adapted for rotation in response to actuation of movement 23 upon change in pressure at the fluid source. Pressure-responsive assembly 21 is of the conventional type used in pressure-responsive gauges and indicators.

Adapted to be mounted upon spindle 24 for rotation therewith is the hub 25 of dial plate 26. Arranged in angularly-spaced relation on the face of dial plate 26 are groups 27 of data arranged in correlation with a series of fluid-supply pressures 29. Each group 27 of data comprises a radially-disposed column of figures with the radially-outward figure representing a fluid-supply pressure 29 and the column of figures radially inward thereof comprising a series 30 of durations of the fluid supply under conditions of use at a correlated series of altitudes.

Adapted to be mounted against the forward end of retaining ring 17 and sealing gasket 20 is a masking disc 35 having a detent 36 adapted to seat in notch 19 of retaining ring 17. Detent 36 prevents angular displacement of masking disc 35 relative to retaining ring 17; angular displacement of the latter with respect to casing 11 is prevented by seating of pin 18 in slot 16. A cover 38 is adapted to be secured to casing 11 by means of screws 39.

Masking disc 35 is provided with a radially extending inspection opening 41 arranged so that a selected group 27 of data corresponding to a particular fluid-supply pressure can be exposed to view through opening 41 with the remaining data groups 27 masked from view. A pointer 42 is disposed at the edge of opening 41 to assist an observer in reading the information on dial face 26. Adjacent the edge of opening 42 is a series of indices 43 representing altitudes and an index 44 representing tank pressure.

In operation casing 11 is mounted in the aircraft cockpit or at any suitable location for ready observation by the operator. Bourdon tube 22 is connected into the fluid-supply system with the compressed-fluid tank. In response to a pressure change in the fluid-supply tank Bourdon tube 22 and movement 23 are actuated to cause spindle 24 to angularly position itself together with dial plate 26 so that the data group 27 corresponding with the supply-tank pressure is exposed through masking disc opening 41. The operator can read through opening 41 by means of index 44, the tank pressure and also by means of indices 43 the duration in hours that the oxygen supply will last at the indicated altitudes.

For example, if the fluid-supply pressure is 900 pounds, there is exposed through opening 41 the data group including this figure. By means of index 44 the pilot observes that the tank pressure is 900 pounds. By means of indices 43 he observes that for use of fluid at altitudes from 10,000 feet to 35,000 feet the fluid supply will last for durations from 3.6 to 1.7 hours as shown in the rest of the data group. Within each data group 27, the durations corresponding to uniformly increasing altitudes do not decrease uniformly. This is true because of the expansion of oxygen fed to the operator's face mask at different altitudes and because of the different pressure effects at different altitudes on the aneroid (not shown) in the diluter demand regulator (not shown) forming part of the conventional oxygen-supply system.

When data disc 26 is in a transition position such that two adjacent data groups 27 are each partially exposed through opening 41, the pilot can interpolate between the two groups of data to determine duration times.

It is to be understood that various modifications and changes may be made in this invention without departing from the spirit and scope thereof as set forth in the appended claim.

The invention described herein may be manufactured and used by or for the Government of the United States of America for governmental purposes without the payment of any royalties thereon or therefor.

What is claimed is:

In an indicating instrument for a gas-feeding system having a compressed-gas supply, a movable dial plate having groups of data thereon for indicating the duration of the compressed-gas supply at different altitudes, a masking plate for said dial plate, said masking plate being formed with a single aperture only through which one of the groups is visible, indices along the edge of the aperture for registration with said groups of data, said indices representing different altitudes, and means responsive to the pressure of the supply for moving said dial plate to various positions corresponding to pressure of the supply whereby one of the groups is visible through the aperture at any one time in registration with said indices.

CLIFFORD P. SEITZ.

REFERENCES CITED

The following references are of record in the file of this patent:

UNITED STATES PATENTS

| Number | Name | Date |
| --- | --- | --- |
| 1,856,079 | Mott | May 3, 1932 |
| 2,112,441 | Lewis | Mar. 29, 1938 |
| 2,389,281 | Staley | Nov. 20, 1945 |